United States Patent
Wang et al.

(10) Patent No.: US 12,466,788 B2
(45) Date of Patent: Nov. 11, 2025

(54) PREPARATION METHOD OF 3-MERCAPTOPROPIONIC ACID

(71) Applicant: HEBEI HOFMANN NEW MATERIAL TECHNOLOGY CO. LTD, Langfang (CN)

(72) Inventors: Xinfu Wang, Langfang (CN); Xiaobo Zhang, Langfang (CN); Zunhua Yang, Langfang (CN); Yuanyuan Xia, Langfang (CN)

(73) Assignee: HEBEI HOFMANN NEW MATERIAL TECHNOLOGY CO. LTD, Langfang (CN)

( * ) Notice: Subject to any disclaimer, the term of this patent is extended or adjusted under 35 U.S.C. 154(b) by 899 days.

(21) Appl. No.: 17/634,703

(22) PCT Filed: Aug. 14, 2020

(86) PCT No.: PCT/CN2020/109243
§ 371 (c)(1),
(2) Date: Feb. 11, 2022

(87) PCT Pub. No.: WO2021/027933
PCT Pub. Date: Feb. 18, 2021

(65) Prior Publication Data
US 2022/0340520 A1  Oct. 27, 2022

(30) Foreign Application Priority Data
Aug. 15, 2019 (CN) .......................... 201910753143.2

(51) Int. Cl.
*C07C 319/06* (2006.01)
*C07C 319/28* (2006.01)

(52) U.S. Cl.
CPC .......... *C07C 319/06* (2013.01); *C07C 319/28* (2013.01); *C07B 2200/13* (2013.01)

(58) Field of Classification Search
None
See application file for complete search history.

(56) References Cited

U.S. PATENT DOCUMENTS 5,256,818 A  10/1993  Tomioka
2014/0323761 A1*  10/2014  Furuya .................. C07C 319/04
562/606

FOREIGN PATENT DOCUMENTS

CN  103946211 A  7/2014
CN  106008296 A  10/2016
(Continued)

OTHER PUBLICATIONS

Recrystallization (https://web.archive.org/web/20150218174051/https://www2.chem.wisc.edu/deptfiles/genchem/Chm346/pdf/recrystallization.pdf#expand, captured Feb. 18, 2015, downloaded Dec. 19, 2024) (Year: 2015).*

(Continued)

*Primary Examiner* — Amy C Bonaparte
(74) *Attorney, Agent, or Firm* — HAUPTMAN HAM, LLP

(57) ABSTRACT

The present disclosure relates to the field of synthesis of mercapto compounds, and in particular, to a preparation method of 3-mercaptopropionic acid. The preparation method provided by the present disclosure comprises the steps of: mixing sodium acrylate with sodium hydrosulfide or sodium sulfide for reacting; adding sodium sulfide (or adding sodium sulfide and sulfur powder) for further reacting; crystallizing, and acidifying with an acid to obtain a solution of 3-mercaptopropionic acid. According to the preparation method provided by the present disclosure, the raw materials are inexpensive, the product 3-mercaptopropionic acid can be obtained with a high yield and high purity, moreover, and solid waste and solvent(s) can be separated and recovered; sodium salt can be used as an industrial (Continued)

product after crystallization; the solvent(s) can be recovered and recycled by distillation; and disposal of three wastes is simple.

3 Claims, 1 Drawing Sheet

(56) References Cited

FOREIGN PATENT DOCUMENTS

| | | | |
|---|---|---|---|
| CN | 110372551 A | | 10/2019 |
| GB | 670702 | * | 4/1952 |

OTHER PUBLICATIONS

International Search Report and Written Opinion issued in corresponding International Application No. PCT/CN2020/109243; mailed Oct. 10, 2020, 12 pgs.

* cited by examiner

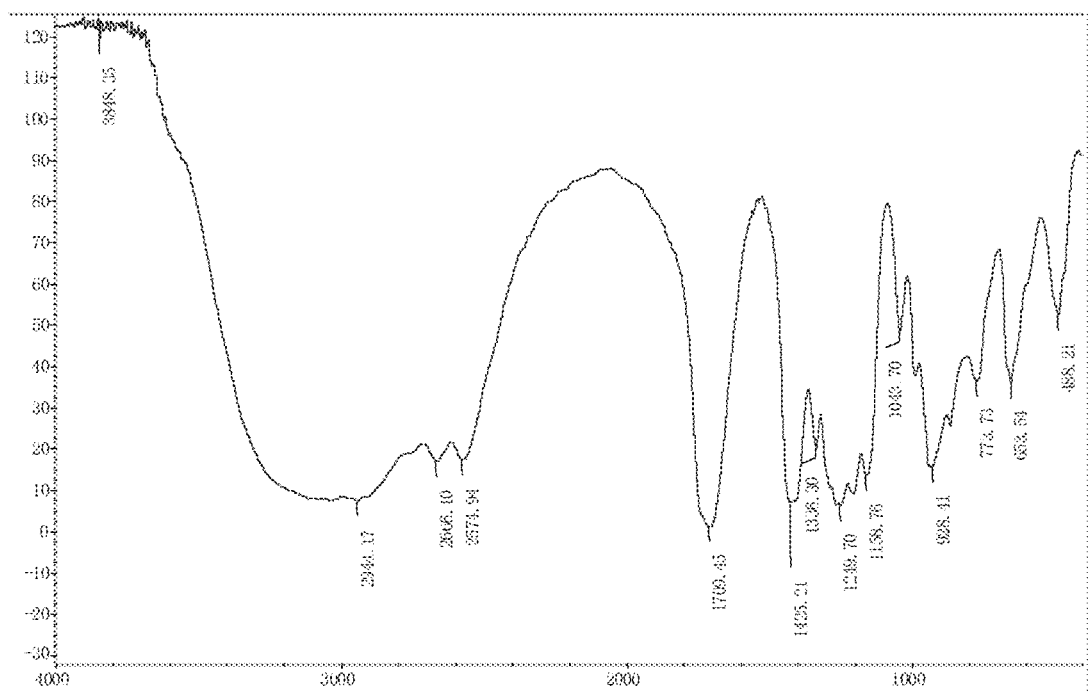

PREPARATION METHOD OF 3-MERCAPTOPROPIONIC ACID

CROSS-REFERENCE TO RELATED APPLICATION

The present application is a U.S. National Phase of International Application Number PCT/CN2020/109243 filed Aug. 14, 2020, and claims priority to Chinese patent application No. 201910753143.2 filed Aug. 15, 2019, entitled "Preparation method of 3-mercaptopropionic acid", filed with the Chinese Patent Office.

TECHNICAL FIELD

The present disclosure relates to the field of synthesis of mercapto compounds, and in particular, to a preparation method of 3-mercaptopropionic acid.

BACKGROUND ART 3-mercaptopropionic acid is an important chemical raw material and intermediate, and can be used as medicine, auxiliaries, and catalysts, etc. It is an intermediate for the drug Fenarol (Chlormezanone), can be used as a stabilizing agent for polyvinyl chloride, can be used as a curing agent for the coating application, and can be used to prepare polycarboxylate superplasticizers.

At present, preparation processes of 3-mercaptopropionic acid at home and abroad mainly include the followings: acrylonitrile-sodium hydrosulfide or sodium thiosulfate process; acrylonitrile-thiourea process; acrylic acid-hydrogen sulfide process; 3-chloropropionic acid-sodium thiosulfate process; and the like. However, these processes generally have the following problems: the used raw materials are toxic or difficult to obtain, e. g., acrylonitrile is highly toxic, and 3-chloropropionic acid is not readily available; reaction requires high standard of equipments, e.g., acrylic acid is corrosive to high pressure vessels; and waste water or waste liquid is difficult to deal with, etc.

The information disclosed in the Background Art is intended merely to enhance an understanding of the general background of the present disclosure and should not be regarded as acknowledging or implying in any way that such information constitutes prior art that is known to a person with ordinary skill in the art.

SUMMARY OF THE INVENTION

Object of the Invention

In order to solve the above technical problems, an object of the present disclosure is to provide a preparation method of 3-mercaptopropionic acid. According to the preparation method provided by the present disclosure, sodium acrylate reacts with sodium hydrosulfide or sodium sulfide to produce sodium monothiopropionate, then sodium sulfide is added (or sodium sulfide and sulfur powder are added) to decompose the sodium monothiopropionate to produce sodium mercaptopropionate, to which an acid is added to obtain 3-mercaptopropionic acid. According to the preparation method provided by the present disclosure, the raw materials are inexpensive, the product 3-mercaptopropionic acid can be obtained with a high yield and high purity, and moreover, solid waste and solvent(s) can be separated and recovered; sodium salt can be used as an industrial product after crystallization; the solvent(s) can be recovered and recycled by distillation; and disposal of three wastes is simple.

Solution of the Invention

In order to achieve the object, the present disclosure provides a preparation method of 3-mercaptopropionic acid, which comprises the following steps:
(1) Sulfuration: mixing sodium acrylate with sodium hydrosulfide or sodium sulfide for reacting;
(2) Decomposition: adding sodium sulfide for further reacting; and
(3) Acidification: crystallizing, and acidifying with an acid to obtain a solution of 3-mercaptopropionic acid.

In a possible embodiment of the above preparation method, in Step (2), sulfur powder is added in addition to sodium sulfide.

In a possible embodiment of the above preparation method, the preparation method comprises the following steps:
(1) Sulfuration: mixing sodium acrylate with sodium hydrosulfide or sodium sulfide, dissolving the mixture with water, and reacting;
(2) Decomposition: adding sodium sulfide and sulfur powder for further reacting; and
(3) Acidification: after completion of the above reactions, cooling, crystallizing, and acidifying with an acid to obtain a solution of 3-mercaptopropionic acid.

Wherein, Step (1) can be represented by a reaction formula as follows:

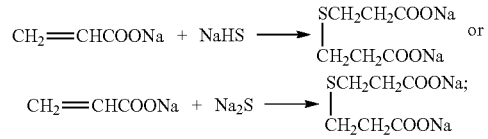

Step (2) and Step (3) can be represented by a reaction formula as follows:

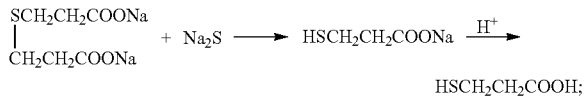

When sulfur powder is added, the reaction in which the sulfur powder is involved can be represented by a reaction formula as follows:

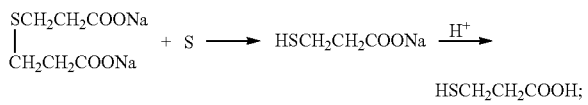

In Step (2), the added $Na_2S$ may react with the unreacted sodium acrylate in Step (1).

In a possible embodiment of the above preparation method, in Step (1), the reaction temperature is in the range of 0-150° C., optionally 40-80° C.; the reaction pressure is in the range of 0.01-1.5 MPa, optionally 0.1-0.5 MPa; and the reaction time is in the range of 0.5-20 h, optionally 1-5 h.

In a possible embodiment of the above preparation method, in Step (2), the reaction temperature of the further reaction is in the range of 50-200° C., optionally 100-150° C.; the reaction pressure of the further reaction is in the range of 0.01-1.5 MPa, optionally 0.1-0.5 MPa; and the reaction time of the further reaction is in the range of 0.5-20 h, optionally 1-5 h.

In a possible embodiment of the above preparation method, in Step (1), a molar ratio of the sodium hydrosulfide or sodium sulfide to the sodium acrylate is in the range of 0.1-10:1; optionally 0.1-2:1.

In a possible embodiment of the above preparation method, in Step (2), a molar ratio of the sodium sulfide to the sodium acrylate is in the range of 0.1-10:1; optionally 0.1-3:1.

In a possible embodiment of the above preparation method, in Step (2), a molar ratio of the sulfur powder to the sodium acrylate is in the range of 0.01-1:1; optionally 0.01-0.04:1.

In a possible embodiment of the above preparation method, in Step (3), a molar ratio of the acid to the sodium acrylate is in the range of 0.1-5:1; optionally 0.1-3:1.

In a possible embodiment of the above preparation method, the preparation method further comprises the steps of: extracting the obtained solution of 3-mercaptopropionic acid, and then distilling under reduced pressure to obtain 3-mercaptopropionic acid.

In a possible embodiment of the above preparation method, the extraction step comprises: adding an organic solvent to the obtained solution of 3-mercaptopropionic acid for extraction, recovering the organic phase, and distilling the organic phase under reduced pressure to obtain 3-mercaptopropionic acid. The solubility of 3-mercaptopropionic acid in an organic solvent is greater than that in water.

In a possible embodiment of the above preparation method, the organic solvent includes one or more of dichloromethane, ethyl acetate, benzene, toluene, chlorobenzene, trichloromethane, tetrachloromethane, N,N-dimethylformamide (DMF), diethylene glycol ether, tetrahydrofuran, dioxane, alkane, or halogenated hydrocarbon; optionally, the organic solvent includes one or more of toluene, chlorobenzene, dichloromethane, or ethyl acetate.

In a possible embodiment of the above preparation method, in Step (3), when acidifying with the acid, the acidifying temperature is in the range of 0-100° C., optionally 50-70° C.; and the acidifying time is in the range of 0.5-5 h, optionally 0.5-3 h.

In a possible embodiment of the above preparation method, the acid includes one or more of sulfuric acid, hydrochloric acid, phosphoric acid, formic acid, or acetic acid; optionally, the acid is sulfuric acid. Different acids have the same acidification effect, and sulfuric acid can be selected for convenience of post-treatment.

In a possible embodiment of the above-mentioned preparation method, the raw material sodium acrylate is a common commercially available raw material, and has a mass percentage of sodium acrylate of 99%-99.9%; and the raw material sodium hydrosulfide is a common commercially available raw material, and has a mass percentage of sodium hydrosulfide of 60%-70%.

In a possible embodiment of the above preparation method, the raw material sodium sulfide is a commonly available raw material, and has a mass percentage of sodium sulfide of 60%-70%.

Beneficial Effects (1) According to the preparation method of 3-mercaptopropionic acid provided in the present disclosure, it is a novel preparation method, and uses sodium acrylate, sodium hydrosulfide, and sodium sulfide as raw materials, which are non-toxic, readily available, and inexpensive, and thereby can reduce production cost and make the method suitable for industrial production; in addition, the 3-mercaptopropionic acid can be obtained with a yield up to 85.4%, and a purity of more than 95%.

(2) According to the preparation method of 3-mercaptopropionic acid provided in the present disclosure, solid waste and solvent(s) can be separated and recovered, sodium salt can be used as an industrial product after crystallization, the solvent(s) can be recovered and recycled by distillation, and disposal of three wastes is simple.

(3) According to the preparation method of 3-mercaptopropionic acid provided in the present disclosure, by selection of specific reaction temperature, reaction pressure, reaction time, and amounts of raw materials and the like during the steps of sulfuration and decomposition, the yield of the sulfuration step and the efficiency of decomposition can be further improved, so that the yield and purity of 3-mercaptopropionic acid can be further improved.

(4) According to the preparation method of 3-mercaptopropionic acid provided in the present disclosure, in the decomposition step, by controlling an addition amount of sulfur powder (which is weakly alkaline, has a low reaction conversion rate, and thus needs to be used in combination with sodium sulfide), cost can be reduced without affecting the reaction conversion rate.

BRIEF DESCRIPTION OF THE DRAWINGS

One or more embodiments are exemplarily illustrated by reference to the figures of the accompanying drawings, and these exemplary illustrations do not constitute limitations to the embodiments. The word "exemplarily" is used exclusively herein to mean "serving as an example, embodiment, or illustration". Any embodiment described herein "exemplarily" is not necessarily to be construed as preferred or advantageous over other embodiments.

The FIGURE is an infrared spectrum of 3-mercaptopropionic acid prepared in Example 2 of the present disclosure.

DETAILED DESCRIPTION OF THE INVENTION

In order to make the objects, technical, solutions and advantages of the embodiments of the present disclosure more apparent, the technical solutions in the embodiments of the present disclosure will be described clearly and completely below. Obviously, the described embodiments are some, but not all, embodiments of the present disclosure. Based on the embodiments of the present disclosure, all other embodiments available for a person of ordinary skill in the art without inventive effort will fall within the scope of the present disclosure. Unless expressly stated otherwise, throughout the specification and claims, the term "comprise", or variations such as "comprises" or "comprising" and the like will be understood to include stated elements or components, but not to exclude other elements or other components.

In addition, in the following detailed description, numerous specific details are set forth in order to provide a thorough understanding of the present disclosure. It will be understood by those skilled in the art that the present disclosure may be practiced without certain specific details. In some embodiments, raw materials, components, methods, means, etc. well known to those skilled in the art are not described in detail in order to highlight the subject matter of the present disclosure.

In the following examples, the raw material sodium acrylate was purchased from Zhengzhou Xinhao Chemical Products Co. Ltd., and had a mass percentage of sodium acrylate of >99%;

the raw material sodium hydrosulfide was purchased from Sinopharm Chemical Reagent Co. Ltd., and had a mass percentage of sodium hydrosulfide of 70%;

the raw material sodium sulfide are purchased from Sinopharm Chemical Reagent Co. Ltd., and had a mass percentage of sodium sulfide of 60%;

the raw material sulfur powder was purchased from Linyi Xingtai Chemical Co. Ltd., and had a mass percentage of sulfur powder of 99%; and the used sulfuric acid was purchased from Sinopharm Chemical Reagent Co. Ltd., and had a mass percentage concentration of 98%.

Example 1

To a 500 mL four-neck flask, 1 mol of sodium acrylate and 0.8 mol of sodium sulfide were added, and then water was added with stirring till dissolution. The resulting mixture reacted at 50° C. under a reaction pressure of 0.2 MPa for 1 h. 0.6 mol of sodium sulfide and 0.02 mol of sulfur powder were added, and then the temperature was increased to 100V, at which the resulting mixture reacted under a reaction pressure of 0.2 MPa for additional 1 h.

After completion of the reaction, the reaction mixture was cooled, crystallized, and filtered with suction, and then 1 mol of sulfuric acid was added to the obtained crystals for acidification with an acidifying temperature of 60° C. and an acidifying time of 1.5 h to obtain a solution of 3-mercaptopropionic acid. The lower layer aqueous solution was cooled for crystallization, and the obtained crystals were washed with a small amount of water, and dried to obtain sodium sulfate crystals, which can be used as an industrial product.

To the obtained solution of 3-mercaptopropionic acid, chlorobenzene was added for extraction, and the organic phase was recovered and distilled under reduced pressure; the front cut fraction was the recovered solvent, which could be recycled for use in the extraction, and the after-cut fraction was 3-mercaptopropionic acid, a colorless liquid; its purity was measured to be 99.5% and its refractive index was 1.492.

In this example, the yield of 3-mercaptopropionic acid was 83.7%.

Example 2

To a 500 mL four-neck flask, 1 mol of sodium acrylate and 0.2 mol of sodium hydrosulfide were added, and then water was added with stirring till dissolution. The resulting mixture reacted at 50° C. under a reaction pressure of 0.15 MPa for 1 h. 1.2 mol of sodium sulfide and 0.01 mol of sulfur powder were added, and then the temperature was increased to 110° C., at which the resulting mixture reacted under a reaction pressure of 0.15 MPa for additional 1 h.

After completion of the reaction, the reaction mixture was cooled, crystallized, and filtered with suction, and then 1 mol of sulfuric acid was added to the obtained crystals for acidification with an acidifying temperature of 60° C. and an acidifying time of 1 h to obtain a solution of 3-mercaptopropionic acid.

To the obtained solution of 3-mercaptopropionic acid, toluene was added for extraction, and the organic phase was recovered and distilled under reduced pressure to obtain a colorless liquid, i.e., 3-mercaptopropionic acid; its purity was measured to be 99.5% and its refractive index was 1.492.

The infrared spectrum was shown in the FIGURE. By comparison, it can be seen that the FIGURE is consistent with the standard infrared spectrum of 3-mercaptopropionic acid.

In this example, the yield of 3-mercaptopropionic acid was 85.4%.

Finally, it should be noted that: the above examples are merely illustrative of the technical solutions of the present disclosure, rather than limiting it; although the present disclosure has been described in detail with reference to the foregoing examples, those skilled in the art will appreciate that: the technical solutions disclosed in the foregoing examples may still be modified, or some of the technical features thereof can be replaced by equivalents; such modifications and substitutions do not depart from the spirit and scope of the examples of the present disclosure in nature.

INDUSTRIAL APPLICABILITY

The present disclosure provides a preparation method of 3-mercaptopropionic acid, which comprises the steps of: Sulfuration: mixing sodium acrylate with sodium hydrosulfide or sodium sulfide for reacting; Decomposition: adding sodium sulfide for further reacting; and Acidification: crystallizing, and acidifying with an acid to obtain a solution of 3-mercaptopropionic acid. The present disclosure provides a new preparation method, in which raw materials are inexpensive, the product 3-mercaptopropionic acid can be obtained with a high yield and high purity, and moreover, solid waste and solvent(s) can be separated and recovered; sodium salt can be used as an industrial product after crystallization; the solvent(s) can be recovered and recycled by distillation; and disposal of three wastes is simple.

The invention claimed is:

1. A preparation method of 3-mercaptopropionic acid, wherein the preparation method consists of the following steps:
   (1) Sulfuration: mixing sodium acrylate with sodium hydrosulfide, dissolving the mixture with water, and reacting;
   (2) Decomposition: adding sodium sulfide and sulfur powder and further reacting;
   (3) Acidification: after completion of the above reactions, cooling, crystallizing, and acidifying with an acid to obtain a solution of 3-mercaptopropionic acid; and
   (4) Extracting the obtained solution of 3-mercaptopropionic acid, and then distilling under reduced pressure to obtain 3-mercaptopropionic acid;
   wherein, the sodium acrylate has a mass percentage of sodium acrylate of >99%; the sodium hydrosulfide has a mass percentage of sodium hydrosulfide of 70%; the sodium sulfide has a mass percentage of sodium sulfide of 60%; and the sulfur powder has a mass percentage of sulfur powder of 99%;
   wherein
   in Step (1), the reaction temperature is in the range of 40-80° C.; the reaction pressure is in the range of 0.01-1.5 MPa; and the reaction time is in the range of 0.5-20 h;
   in Step (2), the reaction temperature of the decomposition reaction is in the range of 100-150° C.; the reaction pressure of the decomposition reaction is in the range of 0.01-1.5 MPa; and the reaction time of the decomposition reaction is in the range of 0.5-20 h;

in Step (3), when acidifying with the acid, the acidifying temperature is in the range of 0-100° C., and the acidifying time is in the range of 0.5-5 h;

in Step (1), a molar ratio of the sodium hydrosulfide to the sodium acrylate is in the range of 0.1-10:1;

in Step (2), a molar ratio of the sodium sulfide to the sodium acrylate is in the range of 0.1-10:1;

in Step (2), a molar ratio of the sulfur powder to the sodium acrylate is in the range of 0.01-1:1; and in Step (3), a molar ratio of the acid to the sodium acrylate is in the range of 0.1-5:1.

2. The preparation method according to claim 1, wherein the extraction step comprises: adding an organic solvent to the obtained solution of 3-mercaptopropionic acid for extraction, recovering the organic phase, and distilling the organic phase under reduced pressure to obtain 3-mercaptopropionic acid.

3. The preparation method according to claim 1, wherein the acid includes one or more of sulfuric acid, hydrochloric acid, phosphoric acid, formic acid, or acetic acid.

\* \* \* \* \*